United States Patent
Shi et al.

(10) Patent No.: US 8,140,017 B2
(45) Date of Patent: Mar. 20, 2012

(54) SIGNAL DETECTION IN COGNITIVE RADIO SYSTEMS

(75) Inventors: Qicai Shi, Coral Springs, FL (US); Neiyer S. Correal, Cooper City, FL (US); Spyros Kyperountas, Weston, FL (US); Zhuan Ye, Vernon Hills, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 834 days.

(21) Appl. No.: 12/241,019

(22) Filed: Sep. 29, 2008

(65) Prior Publication Data

US 2010/0081387 A1 Apr. 1, 2010

(51) Int. Cl.
*H04B 17/00* (2006.01)
(52) U.S. Cl. .......... 455/62; 455/67.11; 375/224
(58) Field of Classification Search .......... 455/62, 455/67.11, 67.14, 67.16, 63.1, 67.13, 500, 455/501, 522, 224, 343.5, 114.2, 115.1, 115.4, 127.1–127.5; 375/224
See application file for complete search history.

(56) References Cited

U.S. PATENT DOCUMENTS

| | | | |
|---|---|---|---|
| 7,043,428 B2 | 5/2006 | Li | |
| 7,349,469 B1 | 3/2008 | Touzni et al. | |
| 2005/0129051 A1 | 6/2005 | Zhu et al. | |
| 2005/0152313 A1 | 7/2005 | Cave et al. | |

*Primary Examiner* — Eugene Yun
(74) *Attorney, Agent, or Firm* — Barbara R. Doutre

(57) ABSTRACT

A cognitive radio wireless device (114) dynamically manages signal detection in a cognitive radio system (100). Spectrum sensing is performed for a first sensing frame on at least one communication channel. At least one observed signal is received (204) on the at least one communication channel. A detection decision (210) is performed to determine if the observed signal is noise or an active signal associated with an active user. The detection decision (210) is performed by comparing observed signal energy estimation with a current detection threshold. The current detection threshold can be an arbitrarily defined threshold or a detection threshold based on a previous detection decision for a sensing frame immediately prior to the first sensing frame.

20 Claims, 3 Drawing Sheets

SIGNAL DETECTION IN COGNITIVE RADIO SYSTEMS

FIELD OF THE INVENTION

The present invention generally relates to the field of wireless communications, and more particularly relates to managing the detection of signals in cognitive radio systems.

BACKGROUND OF THE INVENTION

Wireless communication technology has evolved greatly over the recent years. Recent studies have shown that the wireless spectrum in U.S. is under-utilized, although most of the spectrum has been assigned to licensees, or primary users. Therefore, spectrum sharing has been proposed to alleviate the spectrum scarcity that prevents new wireless services being deployed. Cognitive radio is a promising technology that can allow secondary usage of spectrum without causing harmful interference to the primary systems and/or to any other active users. The secondary users, or cognitive radios, are required to perform spectrum (channel) sensing before accessing a channel.

In order to reliably detect an active signal on a channel, an individual radio needs to have very high sensitivity to offset the fading and shadowing conditions of a radio channel. Additionally, in order to achieve a desired spectrum sensing performance noise estimation operations are generally required to be performed by the cognitive radios. Estimation of noise levels is used to determine detection thresholds for the desired performance of the detection system. However, to reliably estimate noise levels for effective threshold selection, radios generally require a-priori knowledge of when a spectrum will be inactive. Unfortunately, cognitive radios usually do not have access to this a-priori information and, therefore, reliable noise estimation becomes an issue.

SUMMARY OF THE INVENTION

In one embodiment, a method with a cognitive radio wireless device, dynamically manages signal detection in a cognitive radio system. The method includes performing spectrum sensing for a first sensing frame on at least one communication channel. At least one observed signal on the at least one communication channel is received in response to performing spectrum sensing. A detection decision is performed to determine if the observed signal comprises noise or noise and an active signal associated with an active user. The detection decision is performed by determining an energy estimation $\epsilon$ associated with the at least one observed signal. The energy estimation $\epsilon$ is compared with a current detection threshold. If the device has not performed noise detection operations before, the current threshold is set to an initial threshold $\gamma_{initial}$ that can be arbitrarily set. For example, any number greater than the current energy estimation $\epsilon$ such as a number equal to twice the current energy estimation $\epsilon$ can be used as an initial threshold $\gamma_{initial}$. The detection threshold is adaptively changed based upon a previous detection decision. A new detection threshold is set equal to the current detection threshold in response to the energy estimation $\epsilon$ being above the current detection threshold. The new detection threshold is adaptively updated in response to the energy estimation $\epsilon$ being below the current detection threshold. The new detection threshold is used for at least one subsequent detection decision for at least a second sensing frame.

In another embodiment, a cognitive radio wireless device dynamically manages signal detection in a cognitive radio system. The cognitive radio wireless device includes a memory and a processor that is communicatively coupled to the memory. A cognitive engine is communicatively coupled to the memory and the processor. The cognitive engine is adapted to perform spectrum sensing for a first sensing frame on at least one communication channel. At least one observed signal on the at least one communication channel is received in response to performing spectrum sensing. A detection decision is performed to determine if the observed signal comprises noise or noise and an active signal associated with an active user. The detection decision is performed by determining an energy estimation $\epsilon$ associated with the at least one observed signal. The energy estimation $\epsilon$ is compared with a current detection threshold. If the cognitive radio wireless device has not performed noise detection operations before, the current threshold is set to an initial threshold $\gamma_{initial}$ that can be arbitrarily set. For example, any number greater than the current energy estimation $\epsilon$ such as a number equals to twice the current energy estimation $\epsilon$ can be used as an initial threshold $\gamma_{initial}$. The detection threshold is adaptively changed based upon a previous detection decision. A new detection threshold is set equal to the current detection threshold in response to the energy estimation $\epsilon$ being above the current detection threshold. The new detection threshold is adaptively updated in response to the energy estimation $\epsilon$ being below the current detection threshold. The new detection threshold is used by the device for at least one subsequent detection decision for at least a second sensing frame.

In yet another embodiment, a cognitive radio system is disclosed. The cognitive radio system includes a primary wireless communication system that comprises a plurality of primary wireless devices. A secondary wireless communication system comprises a plurality of spectrum sensing nodes. Each spectrum sensing nodes includes a memory and a processor that is communicatively coupled to the memory. A cognitive engine is communicatively coupled to the memory and the processor. The cognitive engine is adapted to perform spectrum sensing for a first sensing frame on at least one communication channel in the primary wireless communication system or the secondary wireless communication system. At least one observed signal on the at least one communication channel is received in response to performing spectrum sensing. A detection decision is performed to determine if the observed signal comprises noise or noise and an active signal associated with an active user. The detection decision is performed by determining an energy estimation $\epsilon$ associated with the at least one observed signal. The energy estimation $\epsilon$ is compared with a current detection threshold. If the device has not performed noise detection operations before, the current threshold is an initial threshold $\gamma_{initial}$ that can be arbitrarily set. For example, any number greater than the current energy estimation $\epsilon$ such as a number equals to twice the current energy estimation $\epsilon$ can be used as an initial threshold $\epsilon_{initial}$. The detection threshold is adaptively changed based upon a previous detection decision. A new detection threshold is set equal to the current detection threshold in response to the energy estimation being above the current detection threshold. The new detection threshold is adaptively updated in response to the energy estimation $\epsilon$ being below the current detection threshold, where the updating method is discussed in greater detail below. The new detection threshold is used for at least one subsequent detection decision for at least a second sensing frame.

An advantage of various embodiments of the present invention is that noise levels within a cognitive radio system are dynamically and adaptively estimated without the need of a-priori information of when the spectrum is inactive. In other words, the various embodiments adaptively and dynamically estimate detection thresholds that take into account time-varying noise levels without the need of a-priori knowledge as to whether an active signal is present or not. Therefore, robust signal detection can be performed that enables cognitive radio devices to effectively utilize available spectrum within the system without interfering with other active users.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

DETAILED DESCRIPTION

As required, detailed embodiments of the present invention are disclosed herein; however, it is to be understood that the disclosed embodiments are merely examples of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention. Additionally, the invention shall have the full scope of the claims and shall not be limited by the embodiments shown below.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. It is further understood that the use of relational terms, if any, such as first, second, top and bottom, front and rear, and the like are used solely for distinguishing one entity or action from another, without necessarily requiring or implying any such actual relationship or order between such entities or actions.

For purposes of this application the term "wireless device" is intended to broadly cover many different types of devices that can wirelessly receive signals, and optionally can wirelessly transmit signals, and may also operate in a wireless communication system. For example, and not for any limitation, a wireless device can include (but is not limited to) any one or a combination of the following: a two-way radio, a cellular telephone, a mobile phone, a smartphone, a two-way pager, a wireless messaging device, a laptop/computer, automotive gateway, or a residential gateway. Additionally, for purposes of this application the term "CR wireless device" is intended to broadly cover wireless devices that can wirelessly communicate signals using cognitive radio communication schemes and techniques.

Wireless Communication System

Figure 1:
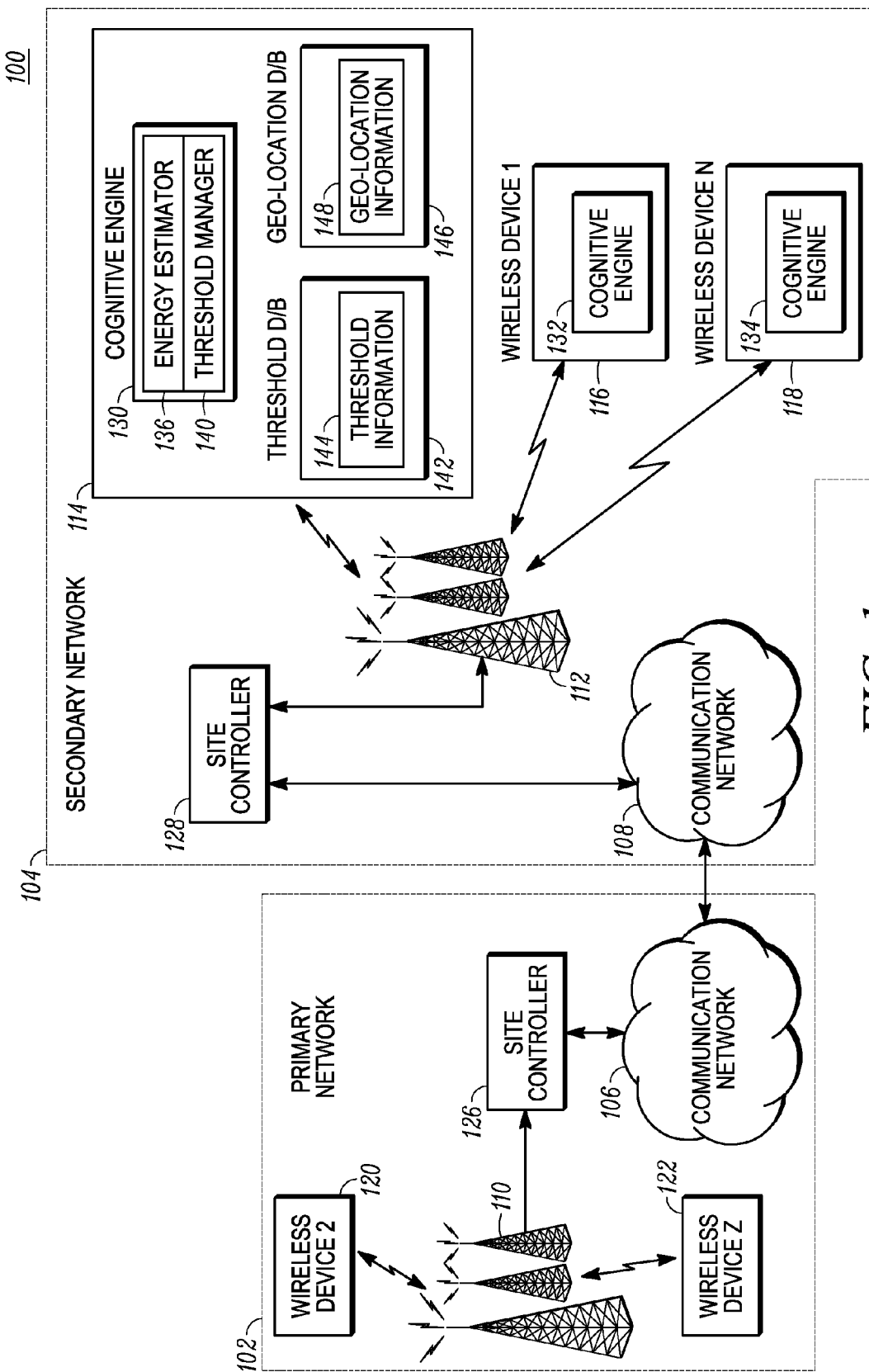
FIG. 1 is block diagram illustrating a wireless communication system according to one embodiment of the present invention.

According to one embodiment of the present invention as shown in FIG. 1 one example of a wireless communication system 100 is illustrated. FIG. 1 shows a plurality of networks 102, 104. Although only two networks 102, 104 are shown, the wireless communication system 100 can comprise additional networks. In one embodiment, one of the networks 102 is a host/primary network and one or more of the additional networks are secondary networks 104. In one embodiment, a host/primary network can be an underlay network and a secondary network can be an overlay network. The host/primary network 102 is assigned RF spectrum that is divided into channels that can potentially be used by the secondary network(s) 104. Throughout this discussion the terms "host" and "primary" that refer to, for example, host/primary network 102, are used interchangeably. The type of wireless communication system that allows for a secondary network to utilize the RF spectrum of a host/primary network is commonly referred to as Cognitive Radio ("CR") system.

Each of the wireless communication networks 102, 104 can include one or more communication networks 106, 108 such as a circuit service network and/or a packet data network. The communication networks 106, 108 can either be wired or wireless. The wireless communications standard of the networks 102, 104 coupling bases stations 110, 112 to mobiles 114 to 122 can comprise Code Division Multiple Access ("CDMA"), Time Division Multiple Access ("TDMA"), Global System for Mobile Communications ("GSM"), General Packet Radio Service ("GPRS"), Frequency Division Multiple Access ("FDMA"), other IEEE 802.16 standards, Orthogonal Frequency Division Multiplexing ("OFDM"), Orthogonal Frequency Division Multiple Access ("OFDNM"), Wireless LAN ("WLAN"), WiMAX, or the like. The wireless communications networks 102, 104 are able to be an IP or SIP based connectivity network, which provides data connections at much higher transfer rates then a traditional circuit services network. These networks are able to comprise an Evolution Data Only ("EV-DO") network, a General Packet Radio Service ("GPRS") network, a Universal Mobile Telecommunications System ("UMTS") network, an 802.11 network, an 802.16 (WiMAX) network, Ethernet connectivity, dial-up modem connectivity, or the like.

A circuit services network is able to provide, among other things, voice services to the wireless devices 114 to 122 communicatively coupled to one or both of networks 102, 104. Other applicable communications standards include those used for Public Safety Communication Networks including TErrestrial TRunked rAdio ("TETRA") and P25 Trunking. It should be noted that these network technologies are only used as an illustrative example and do not limit further embodiments of the present invention. Each of the wireless communication networks 102, 104 includes a plurality of base stations 110, 112. Each of the base stations 110, 112 is communicatively coupled to an information processing system 126, 128 such as a site controller 126, 128.

As discussed above, the wireless communication system 100, in one embodiment, is a CR system. In a cognitive radio (CR) system of the type considered for use by IEEE 802.22, a cognitive secondary radio system utilizes spectrum assigned to a primary system using an opportunistic approach. With this approach, the secondary radio system shares the spectrum with primary incumbents as well as those operating under authorization on a secondary basis. Under these conditions, it is imperative that any user in the cognitive radio system not interfere with primary users.

Therefore, in one embodiment, the devices 114, 116, 118 sense the channel to detect a licensed, primary user 120, 122 and/or any other active user. The devices 114, 116, 118 are allowed to transmit if their transmissions will not interfere with any primary user 120, 122, and with any other active user. In one embodiment this is accomplished by the secondary users 114, 116, 118 detecting active user signals on a given channel. In order to perform signal detection, various embodiments of the present invention utilize adaptive noise level estimation for estimating noise levels, which enables robust signal detection. For example, the noise level estimations, which take into account time-varying noise levels, are used to dynamically and adaptively determine detection thresholds. These detection thresholds are used to identify whether an active signal is on a channel as compared to noise on the channel based on energy estimation $\epsilon$, and therefore can be used by a CR device 114, 116, 118 to determine whether its transmissions would cause interference to another active user and/or to a primary user.

In the example of FIG. 1, the secondary network 104 includes a plurality of sensing nodes that perform spectrum sensing and noise level estimation with respect to the host/primary network 102. In one embodiment, spectrum sensing includes performing noise level estimation, which is discussed in greater detail below, and signal detection, which utilizes the noise level estimations. For example, one or more of the wireless devices 114, 116, 118 within the secondary network 104 can perform noise level estimation on one or more given channels to determine detection threshold(s). As discussed above, the detection threshold enables a device to determine whether noise or an active/primary user signal exists on the given channel(s) and whether its transmission would interfere with the active/primary user.

Therefore, each of the secondary network wireless devices 114, 116, 118 includes a cognitive engine 130, 132, 134 for performing spectrum sensing, managing noise level estimation, and dynamically and adaptively adjusting a detection threshold(s). The cognitive engines 130, 132, 134, in one embodiment, include an energy estimator 136 and a threshold manager 140. The wireless devices 114, 116, 118 also include a threshold database 142 that includes threshold data 144. A geo-location database 146 including geo-location information 148 can also be included within each sensing node 114, 116, 118.

The cognitive engine 130 and its components enable a secondary network wireless device 114 to perform noise level estimation and detection for determining if its transmission would interfere with a primary user 120, 122, and with any other active user. For example, the cognitive engine can accept as one or more inputs spectrum sensing information such as information associated with an observed signal. The cognitive engine can determine noise level estimations for one or more given channels based on the received spectrum sensing information. These noise level estimations are used to dynamically and adaptively adjust the detection threshold(s) for determining whether a given channel has noise or a primary user signal or an active signal from any active user. The cognitive engine 130, can also select any number of the other secondary wireless devices (e.g., sensing nodes) to use for determining the most reliable detection decision (e.g., whether noise or a signal exists) at any given time on any given channel. Stated differently, the cognitive engine 130 of one sensing node 114 can utilize spectrum sensing information from one or more other sensing nodes 116, 118 to more accurately update its detection threshold and perform a more reliable detection decision. The noise level estimation operations and the dynamic adjust of detection thresholds are discussed in greater detail below.

It should be noted that one or more of the base stations 112 within the secondary network 104 can perform spectrum sensing and noise level estimation and detection such as with respect to the host/primary network 102. Also, each secondary network wireless device 114, 116, 118 can transmit information associated with an observed signal such as energy estimation to a central processing system (not shown). This central processing system can then perform noise level estimation and determine whether noise or a signal exists on a particular channel based on a detection threshold managed by the central system. The central system is then able to notify the secondary network wireless devices 114, 116, 118 whether a signal or noise has been detected on the given channel so the wireless devices 114, 116, 118 can decide to transmit or not transmit on the channel.

Signal Detection

The following is a more detailed discussion on signal detection in a cognitive radio system without a-priori knowledge of channel states (e.g., signal absent/present).

Energy detection is traditionally formulated as a binary hypothesis testing problem where the detector must decide between two hypotheses:

$$H_0: x(t)=n(t);$$

$$H_1: x(t)=n(t)+s(t); \quad (Eq.\ 1)$$

Where $H_0$ is the hypothesis that the primary signal is not present in the observed channel. $H_1$ is the hypothesis that the primary signal is present in the observed channel. The variable x(t) is the received signal at time t, n(t) is the noise at time t, s(t) is the presented primary signal at time t. With a digital implementation of the radiometer, the received signal x(t) is sampled, squared, and then averaged over M samples to generate the energy estimation $\epsilon$. A detection decision is performed to determine if the observed signal comprises noise or noise and an active signal associated with a primary user. The detection decision is performed by comparing the energy estimation $\epsilon$ with a detection threshold $\gamma$. The cognitive engine 130 determines that a signal is present if the energy estimation $\epsilon$ is greater than the detection threshold $\gamma$. The cognitive engine 130 determines that a signal is not present if the energy estimation $\epsilon$ is less than the detection threshold $\gamma$.

The probability of false alarm $P_{fa}$ corresponds to the probability that the cognitive engine 130 determines that a signal is present when noise is only received. The probability of detection $P_d$ is the probability of correctly determining that the signal is present when signal embedded in noise is received.

The threshold $\gamma$ is usually determined to guarantee a constant probability of false alarm. This is accomplished, in one embodiment, by using the probability of false alarm equation with some preset probability of false alarm (e.g., $P_{fa\_Set}=10\%$) as given by:

$$\gamma=m+\sigma\cdot Q^{-1}(P_{fa\_}\text{Set}) \quad (EQ.\ 2)$$

Where m is the mean of the energy estimation $\epsilon$, $\sigma$ is the variance of the energy estimation $\epsilon$. $Q^{-1}$ is the inverse of Q function. Q function Q(x) is defined as the probability that a standard normal random variable (zero mean, unit variance) exceeds x: Q(x)=1/sqrt(2*pi)*integral from x to infinite of exp(−t^2/2).

Usually the noise n(t) is modeled as a white Gaussian noise with 0 mean: n~N(0, $\sigma_0$). Where $\sigma_0$ is the standard deviation of the white Gaussian noise. Under this assumption, the mean and variance of the energy estimation ϵ can be approximated as:

$$m = \sigma_0^2; \sigma = \frac{\sigma_0^2}{\sqrt{M/2}} \quad \text{(EQ. 3)}$$

Plugging (Eq. 3) into (Eq. 2), the detection threshold can be expressed as:

$$\gamma = \sigma_0^2 \cdot \left(1 + \frac{Q^{-1}(\text{Pfa\_set})}{\sqrt{M/2}}\right). \quad \text{(EQ. 4)}$$

Ideally, if the noise variance is known, the cognitive engine(s) 130 of a sensing node 114 can set the threshold with (Eq. 4) to provide a constant probability of false alarm and the detection will perform as designed. However, in real environments, the true noise variance is not known. Therefore, the cognitive engine 130 of a sensing node 114 estimates the noise variance v from the noise samples n:

$$v = \sigma_{esi}^2 = \frac{1}{N} \sum_{i=1}^{N} n_j^2 \quad \text{(Eq. 5)}$$

Where N is the number of samples used for noise variance estimation. For a larger number of N, the variance estimate is a random variant with normal distribution.

Replacing the ideal noise variance with the estimated variance, the threshold becomes $$\gamma = v \cdot \left(1 + \frac{Q^{-1}(\text{Pfa\_set})}{\sqrt{M/2}}\right). \quad \text{(Eq. 6)}$$

However, to reliably estimate noise variance v from the noise samples, radios generally require a-priori knowledge of when a spectrum will be inactive. Unfortunately, cognitive radios usually do not have access to this a-priori information and, therefore, reliable noise estimation becomes an issue.

Figure 2:
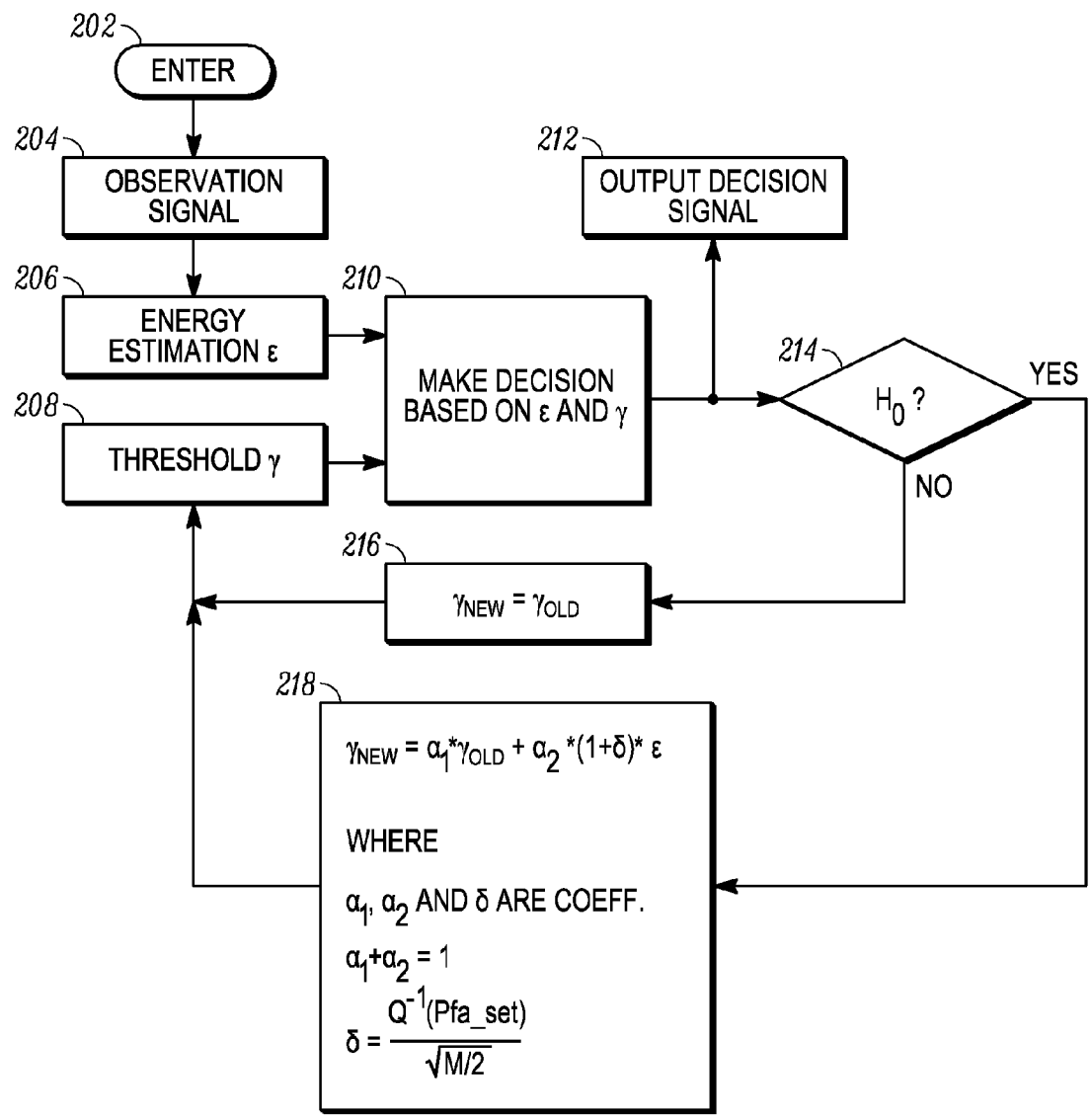
FIG. 2 is an operation flow diagram illustrating one example of performing adaptive and dynamic noise/signal detection and detection threshold updating without a-priori knowledge of channel status according to one embodiment of the present invention.

FIG. 2 shows one example of adaptive and dynamic signal detection performed by a cognitive engine 130 of a CR device 114 without the need of a-priori knowledge as to whether a signal is present or not. The operational flow diagram of FIG. 2 begins at step 202 and flows directly into step 204. It should be noted that when the CR device 114 performs spectrum sensing to obtain signal information associated with a given channel, the CR device 114 can reference representations 148 of geographic locations of prohibited wireless communication bands and known band-edges of a CR wireless communication system that can vary by geographic location. This geo-location information 148 can be stored in the geo-location database 146. Fixed transmitters can create a band-edge for a CR wireless communication system in or around a certain geographic region. The CR wireless device 114, in one embodiment, compares GPS data received from a GPS receiver to predefined locations of prohibited wireless communication bands and known band-edges of a CR wireless communication system that are stored in the non-volatile storage memory 516, such as in a geo-location database 146.

The CR device 114 performs spectrum sensing on one or more channels in the primary network 102 and senses an observation signal. In one embodiment, the CR network such as the wireless communication system 100 of FIG. 1 operates on a super-frame by super-frame basis. There are two types of frames in each super-frame: data communication frames and spectrum sensing frames. A time division protocol, in one embodiment, is used to divide the super-frame into these two smaller frames. The duration of the spectrum sensing frame and the frequency of sensing frame can vary in time in order to satisfy the network throughput requirements. The network throughput requirements can vary based on the requirements of different applications.

A spectrum sensing frame can be further divided into sub-frames, where in each sub-frame a sensing node performs sensing on only one particular channel. Therefore, the observation signal, in one embodiment, is obtained on a frame-by-frame basis and the process shown in FIG. 2 is performed for each frame. Stated differently, the detection threshold for each current observation depends on the observation and decision for the previous sensing frame.

The observation signal, at step 204, is analyzed by the cognitive engine 130. The energy level estimator 136, at step 206, estimates the energy level associated with the observed signal. For example, received signal strength indicator can be used to estimate the energy. The threshold manager 140, at step 208 (which can occur simultaneously with step 206), also obtains current threshold information 144 from the threshold database 142. The current threshold information is either the detection threshold that has been determined based on a previous frame or an initial threshold. The current threshold information is used by the cognitive engine to determine whether the observed signal is a noise or an active signal.

If the CR device 114 has not performed noise detection operations on the primary network 102 before, the current threshold at step 208 is an initial threshold $\gamma_{initial}$. The initial threshold can be arbitrarily set to be a number greater than the current energy estimation ϵ. For example, a number equal to twice the current energy estimation ϵ can be used as an initial threshold $\gamma_{initial}$. Based on the energy estimation ϵ performed at step 206 and the current threshold at step 208, the cognitive engine 130, at step 210 determines if the observed signal on the channel for the current frame is a noise or an active signal.

For example, the cognitive engine 130 determines if the energy estimate ϵ of the observed signal is above the current detection threshold γ. If the energy estimate ϵ is above the threshold γ then the cognitive engine 130 determines that the observed signal is an active signal (e.g., a primary user is transmitting). However, if the energy estimate ϵ is below the threshold γ then the cognitive engine 130 determines that the observed signal is a noise and the secondary wireless device 114 is able to transmit on that channel without interfering with a primary user. The cognitive engine 130, at step 212, optionally outputs a decision signal based on the decision made at step 210. This decision signal can be used by the cognitive engine 130 or a fusion center at an information processing system to ensure that the cognitive engine 130 is performing reasonably well (e.g., correctly determining that a noise or an active signal is on a channel). Also, the output decision signal can ensure that the threshold is reset if the threshold remains the same for a given number of iterations.

The cognitive engine 130, at step 214, determines if the decision made at step 210 indicates that the observed signal only includes noise ($H_0$). If the result of this determination is negative, e.g., the observed signal includes noise+signal ($H_1$), the threshold manager 140, at step 216, sets the new threshold $\gamma_{new}$ equal to the old threshold $\gamma_{old}$. Stated differently, the current threshold which was determined based on the previous frame is not adjusted for the current frame. However, if the cognitive engine 130 determines at step 214 that the decision made at step 210 indicates that the observed signal only includes noise then the threshold manager 140, at step 218, updates the detection threshold. For example, the threshold manager 140 sets $\gamma_{new}=\alpha_1\gamma_{old}+\alpha_2(1+\delta)\epsilon$, where $\alpha_1$, $\alpha_2$, and $\delta$ are coefficients with $\alpha_1$ and $\alpha_2$ being weight coefficients, $\alpha_1+\alpha_2=1$, and $$\delta = \frac{Q^{-1}(\text{Pfa\_set})}{\sqrt{M/2}}.$$

A larger $\alpha_1$ places more weight on the previous threshold (or history data) and less weight on the previous measurement, and vice versa.

The variable $\alpha_1$ is a first weighted coefficient that is weighted on the current detection threshold $\gamma$. The variable $\alpha_1$, in one embodiment, is an arbitrary number that is one of greater than or equal to zero and less than or equal to one. The variable $\alpha_2$ is a second weighted coefficient that is weighted on the energy estimation $\epsilon$. The variable $\alpha_2$, in one embodiment, is equal to one minus the first weighted coefficient $\alpha_1$. The third coefficient $\delta$ is a function of a preset probability of false alarm and a number of observed signals for the energy estimation $\epsilon$. The process discussed above then repeats for each frame being sensed. Therefore, by iteratively performing the above process for each spectrum sensing frame the probability of false alarms approaches a preset value. This allows for robust signal detection without a-priori knowledge of whether a channel is active or not active.

While we have described an example of a method for detection of signal associated with a primary user, it should be understood that this method can be used for detection of signal associated with any active user in any communication channel. The scope of the invention is not to be restricted, therefore, to the specific method described in the present example.

Example of a CR Wireless Device

Figure 3:
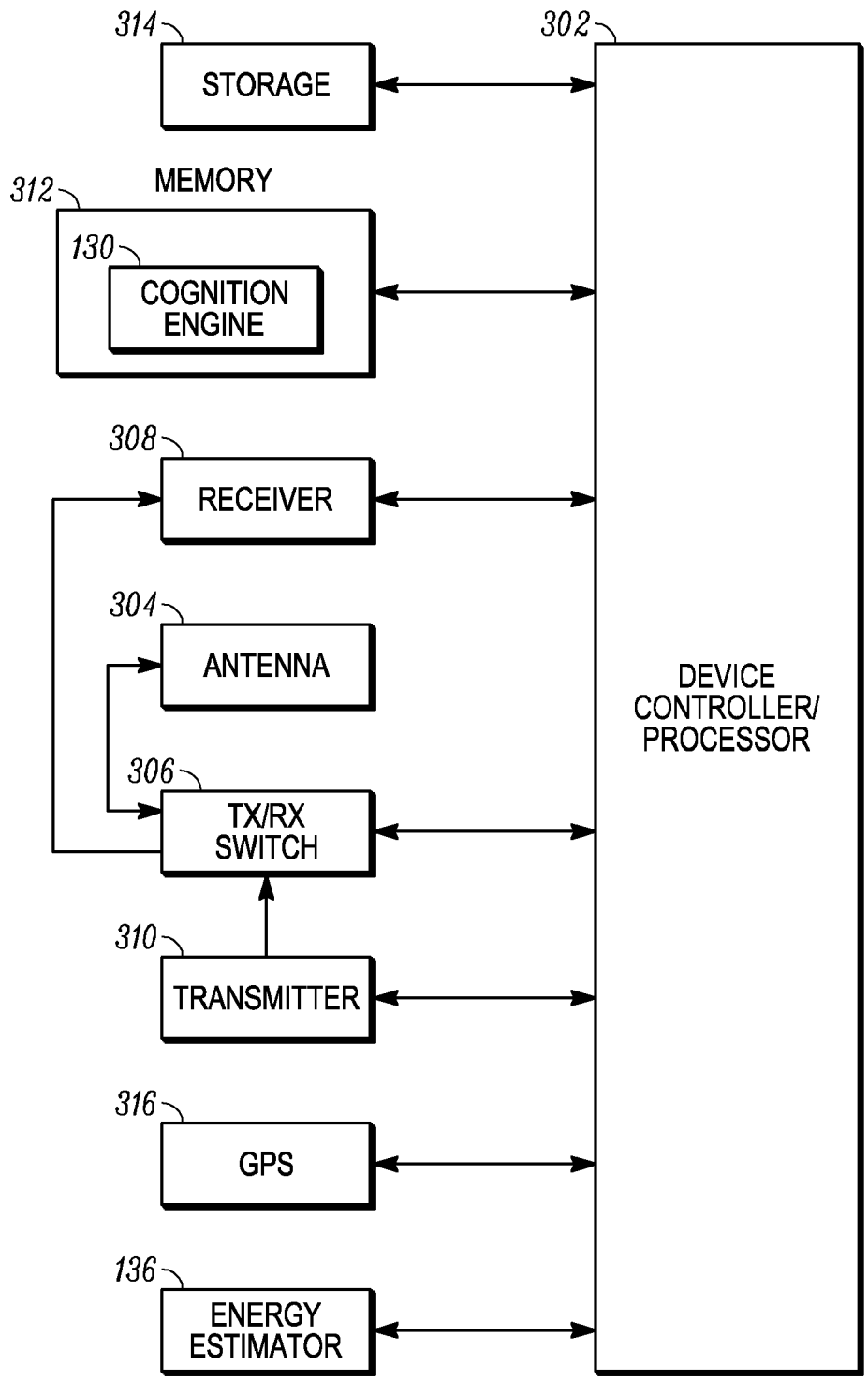
FIG. 3 is a block diagram illustrating a detailed view of a wireless device according to one embodiment of the present invention.

Referring now to FIG. 3, a more detailed view of an example of a CR wireless device 114 is shown. It is assumed that the reader is familiar with wireless communication devices. To simplify the present description, only that portion of a wireless communication device that is relevant to the present invention is discussed. The CR wireless device 114 shown in FIG. 3 operates under the control of a device controller/processor 302, that controls the sending and receiving of wireless communication signals. In receive mode, the device controller 302 electrically couples an antenna 304 through a transmit/receive switch 306 to a receiver 308. The receiver 308 decodes the received signals and provides those decoded signals to the device controller 302.

In transmit mode, the device controller 302 electrically couples the antenna 304, through the transmit/receive switch 306, to a transmitter 310. It should be noted that in one embodiment, the receiver 308 and the transmitter 310 are a dual mode receiver and a dual mode transmitter for receiving/transmitting over various access networks providing different air interface types. In another embodiment a separate receiver and transmitter are used for each of type of air interface. A memory 312 includes, among other things, a cognitive engine 130. The components of the cognitive engine 130 such as the threshold manager 140 and the threshold database 142, threshold information 144, a geo-location database, and geo-location information 148 have not been shown in FIG. 3 for simplicity. An operational process, such as illustrated in FIG. 3, is provided by interoperation between the cognition engine 130 and the device controller 302. The CR wireless device 114 also includes non-volatile storage memory 314 for storing, for example, an application waiting to be executed (not shown) on the CR wireless device 114. An energy estimator 136 for estimating the energy of an observed signal is also communicatively coupled to the device controller/processor 302.

Additionally, according to one embodiment of the invention, a Global Positioning System (GPS) receiver 316 is coupled with the device controller 302 to provide location information to the CR wireless device. This is only one non-limiting example of a means of determining location of the CR wireless device. There are many other ways for a CR wireless device to determine its location. The GPS receiver 316 is associated with the CR wireless device, and not necessarily in the CR wireless device. The device controller 302 can receive data from the GPS receiver 316. The CR wireless device in this way can determine where it is located, such as relative to a geographic location grid and/or map.

Non-Limiting Examples

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method, with a cognitive radio wireless device, for dynamically managing signal detection in a cognitive radio system, the method comprising:

performing spectrum sensing for a first sensing frame on at least one communication channel;

receiving, in response to performing spectrum sensing, at least one observed signal on the at least one communication channel; and performing a detection decision to determine if the observed signal is one of noise and an active signal associated with an active user, wherein performing the detection decision comprises:

determining an energy estimation $\epsilon$ associated with the at least one observed signal;

comparing the energy estimation $\epsilon$ with a current detection threshold, wherein the current detection threshold is one of an arbitrarily defined threshold and a detection threshold based on a previous detection decision for a sensing frame immediately prior to the first sensing frame;

setting, in response to the energy estimation being above the current detection threshold, a first new detection threshold equal to the current detection threshold; and setting, in response to the energy estimation $\epsilon$ being below the current detection threshold, a second new detection threshold as a function of the current detection threshold and the energy estimation $\epsilon$;

wherein one of the first and second new detection threshold is used for at least one subsequent detection decision for at least a second sensing frame.

2. The method of claim 1, wherein the function of the current detection threshold and the energy estimation $\epsilon$ is a linear weighted average, wherein the linear weighted average includes:

a first weighted coefficient that is weighted on the current detection threshold, wherein the first weighted coefficient is an arbitrary number that is one of greater than or equal to zero and less than or equal to one; and a second weighted coefficient that is weighted on the energy estimation $\epsilon$, wherein the second weighted coefficient is equal to one minus the first weighted coefficient then multiplied by one plus a third coefficient, wherein the third coefficient is a function of a preset probability of false alarm and a number of observed signals for the energy estimation $\epsilon$.

3. The method of claim 1, wherein the energy estimation $\epsilon$ is based at least on a received signal strength indicator associated with the at least one observed signal.

4. The method of claim 1, further comprising:
determining a reliability threshold associated with the detection decision based on at least the energy estimation $\epsilon$ and a radio noise floor.

5. The method of claim 1, further comprising:
receiving at least one detection decision indicating that the at least one communication channel for the first sensing frame comprises at least one of noise and an active signal from at least one other cognitive radio wireless device.

6. The method of claim 5, wherein the detection decision is further based on the at least one detection decision received from the at least one other cognitive radio wireless device.

7. The method of claim 5, wherein the at least one detection decision received from the at least one other cognitive radio wireless device is associated with a reliability indicator.

8. The method of claim 1, wherein the initial threshold is set above a radio noise floor associated with the at least one communication channel.

9. A cognitive radio wireless device for dynamically managing signal detection in a cognitive radio system, the cognitive radio wireless device comprising:
a memory;
a processor communicatively coupled to the memory and
a cognitive engine communicatively coupled to the memory and the processor, wherein the cognitive engine is adapted to:
perform spectrum sensing for a first sensing frame on at least one communication channel;
receive, in response to spectrum sensing being performed, at least one observed signal on the at least one communication channel; and
perform a detection decision to determine if the observed signal is one of noise and an active signal associated with an active user, wherein performing the detection decision comprises:
determine an energy estimation $\epsilon$ associated with the at least one observed signal;
compare the energy estimation $\epsilon$ with a current detection threshold, wherein the current detection threshold is one of an arbitrarily defined threshold and a detection threshold based on a previous detection decision for a sensing frame immediately prior to the first sensing frame;
set, in response to the energy estimation being above the current detection threshold, a first new detection threshold equal to the current detection threshold; and
set, in response to the energy estimation $\epsilon$ being below the current detection threshold, a second new detection threshold as a function of the current detection threshold and the energy estimation $\epsilon$;
wherein one of the first and second new detection threshold is used for at least one subsequent detection decision for at least a second sensing frame.

10. The cognitive radio wireless device of claim 9, wherein the function of the current detection threshold and the energy estimation $\epsilon$ is a linear weighted average, wherein the linear weighted average includes:
a first weighted coefficient that is weighted on the current detection threshold, wherein the first weighted coefficient is an arbitrary number that is one of greater than or equal to zero and less than or equal to one; and
a second weighted coefficient that is weighted on the energy estimation $\epsilon$, wherein the second weighted coefficient is equal to one minus the first weighted coefficient then multiplied by one plus a third coefficient, wherein the third coefficient is a function of a preset probability of false alarm and a number of observed signals for the energy estimation $\epsilon$.

11. The cognitive radio wireless device of claim 9, wherein the estimation $\epsilon$ is based at least on a received signal strength indicator associated with the at least one observed signal.

12. The cognitive radio wireless device of claim 9, wherein the cognitive engine is further adapted to:
determine a reliability threshold associated with the detection decision based on at least the estimation $\epsilon$ and a radio noise floor.

13. The cognitive radio wireless device of claim 9, wherein the cognitive engine is further adapted to:
receive at least one detection decision indicating that the at least one communication channel for the first sensing frame comprises at least one of noise and an active signal from at least one other cognitive radio wireless device.

14. The cognitive radio wireless device of claim 13, wherein the detection decision is further based on the at least one detection decision received from the at least one other cognitive radio wireless device.

15. The cognitive radio wireless device of claim 13, wherein the at least one detection decision received from the at least one other cognitive radio wireless device is associated with a reliability indicator.

16. The cognitive radio wireless device of claim 9, wherein if the energy estimation $\epsilon$ is determined to be above the current detection threshold the detection decision indicates that the observed signal is an active signal associated with a primary user, and wherein if the energy estimation $\epsilon$ is determined to be below the current detection threshold the detection decision indicates that the observed signal is noise.

17. A cognitive radio system comprising:
a primary wireless communication system, wherein the primary wireless communication system comprises a plurality of primary wireless devices;
a secondary wireless communication system, wherein the secondary wireless communication system comprises a plurality of spectrum sensing nodes, wherein each spectrum sensing nodes includes;
a memory;
a processor communicatively coupled to the memory; and
a cognitive engine communicatively coupled to the memory and the processor, wherein the cognitive engine is adapted to:
perform spectrum sensing for a first sensing frame on at least one communication channel in one of the primary wireless communication system and the secondary wireless communication system;
receive, in response to spectrum sensing being performed, at least one observed signal on the at least one communication channel; and
perform a detection decision to determine if the observed signal is one of noise and an active signal associated with an active user, wherein performing the detection decision comprises:

determine an energy estimation $\epsilon$ associated with the at least one observed signal;

compare the energy estimation $\epsilon$ with a current detection threshold, wherein the current detection threshold is one of an arbitrarily defined threshold and a detection threshold based on a previous detection decision for a sensing frame immediately prior to the first sensing frame;

set, in response to the energy estimation being above the current detection threshold, a first new detection threshold equal to the current detection threshold; and set, in response to the energy estimation $\epsilon$ being below the current detection threshold, a second new detection threshold as a function of the current detection threshold and the energy estimation $\epsilon$;

wherein one of the first and second new detection threshold is used for at least one subsequent detection decision for at least a second sensing frame.

18. The cognitive radio system of claim 17, wherein the cognitive engine is further adapted to:

receive at least one detection decision indicating that the at least one communication channel for the first sensing frame comprises at least one of noise and an active signal from at least one other cognitive radio wireless device.

19. The cognitive radio system of claim 17, wherein the detection decision is further based on the at least one detection decision received from the at least one other cognitive radio wireless device.

20. The cognitive radio system of claim 17, wherein the initial threshold is set above a radio noise floor associated with the at least one communication channel.

* * * * *

UNITED STATES PATENT AND TRADEMARK OFFICE
CERTIFICATE OF CORRECTION

PATENT NO. : 8,140,017 B2  Page 1 of 1
APPLICATION NO. : 12/241019
DATED : March 20, 2012
INVENTOR(S) : Shi et al.

It is certified that error appears in the above-identified patent and that said Letters Patent is hereby corrected as shown below:

In Column 2, Line 54, delete " $\epsilon_{initial}$ " and insert -- $\gamma_{initial}$ --, therefor.

In Column 4, Line 37, delete "("OFDNM")" and insert -- ("OFDMA") --, therefor.

In Column 8, Line 27, delete "206 )," and insert -- 206), --, therefor.

Signed and Sealed this
Eighth Day of January, 2013

David J. Kappos
*Director of the United States Patent and Trademark Office*